United States Patent [19]

Remick et al.

[11] 4,283,885
[45] Aug. 18, 1981

[54] EMERGENCY RELEASE CLOSURE

[75] Inventors: David W. Remick, Camillus; Charles J. Stankivitz, Sr., Wampsville, both of N.Y.

[73] Assignee: The O. M. Edwards Company, Inc., Syracuse, N.Y.

[21] Appl. No.: 107,148

[22] Filed: Dec. 26, 1979

[51] Int. Cl.³ .............................................. E06B 7/18
[52] U.S. Cl. ........................................ 49/466; 49/141
[58] Field of Search .................. 49/466, 463, 141, 465

[56] References Cited

U.S. PATENT DOCUMENTS

| | | | |
|---|---|---|---|
| 2,572,124 | 10/1951 | Eichner | 49/141 |
| 2,583,978 | 1/1952 | Watter et al. | 49/141 |
| 3,739,527 | 6/1973 | Schubach | 49/141 X |
| 3,806,188 | 4/1974 | Tantlinger | 49/141 X |
| 3,807,791 | 4/1974 | Boyer | 49/141 X |
| 3,927,492 | 12/1975 | Carson | 49/141 |

Primary Examiner—Philip C. Kannan
Attorney, Agent, or Firm—Bruns & Jenney

[57] ABSTRACT

A safety release closure suitable for use in a mass transit vehicle which can be rapidly and efficiently removed either inwardly or outwardly in case of an emergency. The closure includes a removable sash that is mounted within a frame opening and secured in place by means of inside and outside deformable seals disposed between the frame and the inside and outside margins of the sash. The perimeter walls of the opening that face the sash are contoured so that the opening is wider across both edges than it is along the middepth region whereby the sash can be easily removed in both directions without it becoming wedged or otherwise jammed in the frame. Means for stripping the seals on both sides of the sash are provided for as are handle means which enable a person to pull the sash out of the frame after the seal has been removed.

12 Claims, 3 Drawing Figures

EMERGENCY RELEASE CLOSURE

BACKGROUND OF THE INVENTION

This invention relates to a safety release closure suitable for use in a mass transit vehicle which can be rapidly and conveniently removed either toward the inside or the outside of a vehicle with little or no danger of the closure becoming wedged or otherwise jammed in the surrounding support structure.

As disclosed in U.S. Pat. Nos.: 3,927,492; 3,806,188; 3,739,527, many emergency windows that are used today in mass transit vehicles are designed to open in one direction upon a fixed hinge or pivot mechanism. Gernerally, to prevent injury to the passengers, the window is caused to swing outwardly or away from the passenger compartment. This necessitates that a protruding and generally unsightly hinge be mounted along at least one margin of the window sash. More importantly, the hinged, one-way window is highly susceptible to failure in case of an accident. The hinge can become damaged to a point of failure or the surrounding supporting structure can be pushed against the window to prevent it from swinging in an outward direction.

As further disclosed in U.S. Pat. No. 2,572,124 some emergency windows are constructed without hinges and are arranged to be removed either to the inside or outside of the vehicle. The emergency window, in this case, is supported in the frame by means of wedge strips that can be pulled free to release the window sash from the supporting frame. Here again, however, the window can become wedged within the frame if it is not pulled therefrom in a direction that is generally perpendicular to the frame. Any deviation from this critical path of travel will tend to turn the sash obliquely within the frame, thus causing it to jam. The natural tendency in an emergency situation is to apply greater pulling force against the jammed sash. This, of course, is counterproductive and usually results in the sash becoming inextricably bound to the frame.

SUMMARY OF THE INVENTION

It is therefore an object of the present invention to improve safety release closures of the type used in mass transit vehicles.

A further object of the present invention is to provide for the safety and comfort of the passengers using a mass transit vehicle.

Another object of the present invention is to provide an emergency window for use in a mass transit vehicle that can be quickly and dependably opened either toward the inside or the outside of the vehicle.

A still further object of the present invention is to prevent a removable emergency closure from becoming jammed within its support frame.

These and other objects of the present invention are attained by means of a safety release closure for use in a mass transit vehicle that includes a mounting frame having an opening formed therein whose peripheral walls are contoured so that the opening is wider across the inner and the outer edges than at the middepth region thereof. A complimentary sash is mounted within the opening and secured in assembly by means of an inner deformable seal and an outer deformable seal which are disposed between the outer margins of the sash and the frame. Means are provided to strip the seals from the assembly in the event of an emergency. Handles located on both the inside and the outside of the sash enable the freed sash to be easily pulled from the frame, thereby furnishing an emergency exit to those inside the vehicle.

BRIEF DESCRIPTION OF THE DRAWINGS

For a better understanding of these and other objects of the present invention reference is had to the following detailed description of the invention which is to be read in conjunction with the following drawings, wherein:

FIG. 3 is an enlarged partial view of the sash looking at the outside face thereof, taking particular notice of the emergency pull ring associated therewith.

DESCRIPTION OF THE INVENTION

Figure 1:
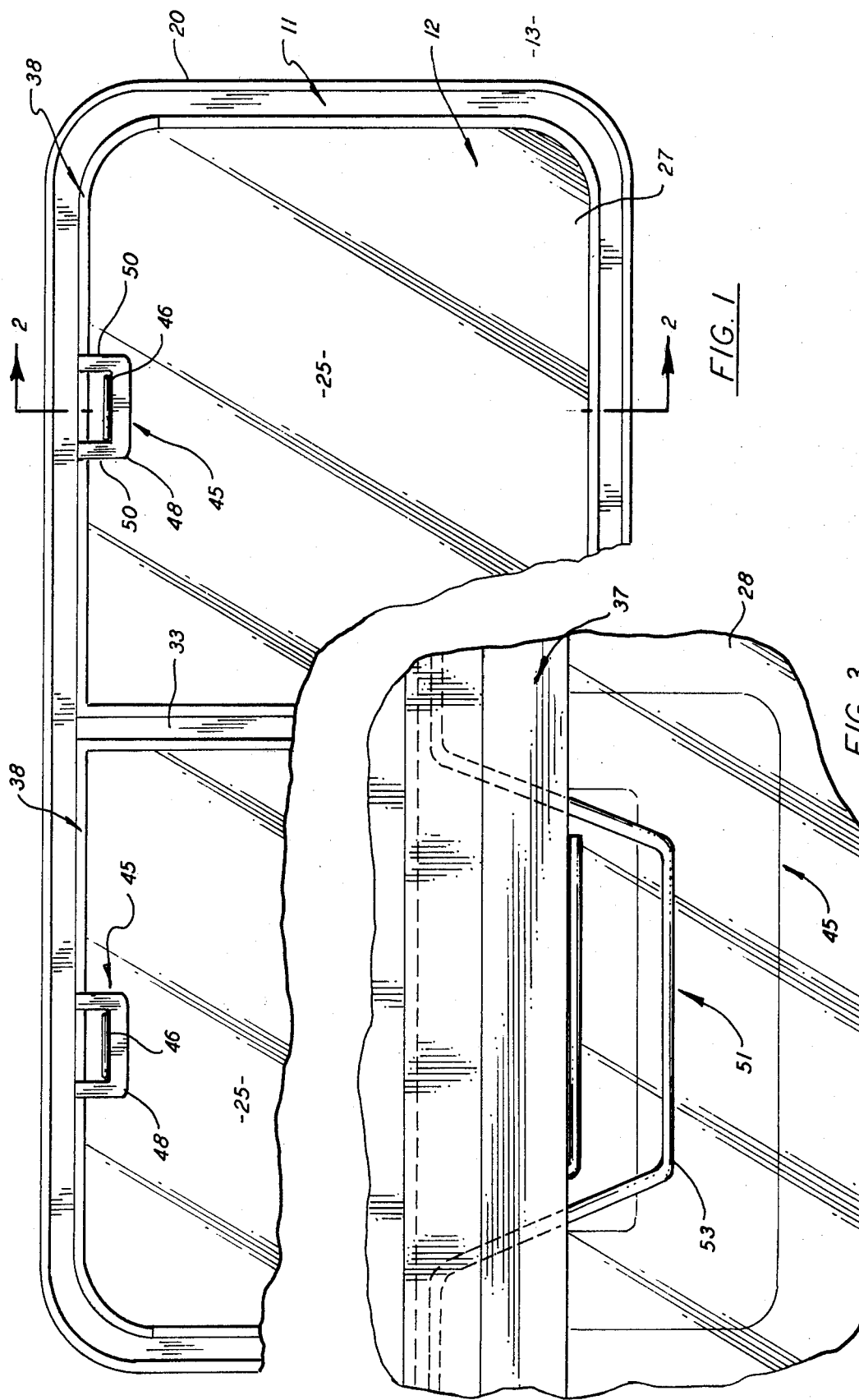
FIG. 1 is a partial side elevation with a portion broken away illustrating a double glazed emergency sash and support frame which embody the teachings of the present invention with the view looking at the inside face of the sash.

Referring now more specifically to the drawings, and with particular reference to FIG. 3, the apparatus of the present invention includes a mounting frame 11 in which is situated a double glazed sash assembly generally referenced 12. The frame, in assembly, is secured to the body 13 of a vehicle which typically will be a vehicle for transporting passengers such as a railroad car. In this particular embodiment of the invention the frame is an extruded unit having vertical flanges 15—15 located along the inside face thereof that abut receiving surfaces 16—16 provided in the car body. The flanges are secured to the body using any suitable means known and in use in the industry. The top front surface of the frame contains an outwardly extended rib 19 extending about its periphery. A weathertight gromet 20 is fitted as shown in FIG. 2 about the rib and similarly joined to the vehicle body to furnish an enclosure that will be weathertight.

A pair of sash units, generally referenced 25 (FIG. 1) are mounted in assembly within the frame opening. In this particular embodiment, each sash is a double glazed unit that is also of extruded construction having two lights, an interior light 27 and an exterior light 28 mounted therein. Preferably the lights are formed of a tempered safety glass and are held within seats 31—31 using a neoprene glazing material to provide a one-piece weathertight assemblage. Although not shown, a desiccant may be placed between the interior and exterior lights to prevent moisture buildup in this critical region. The two sash units are separated by a mullion 33 which is dependent upon the frame structure and which serves to divide the frame so that it contains two openings 34—34 of generally rectangular form.

Figure 2:
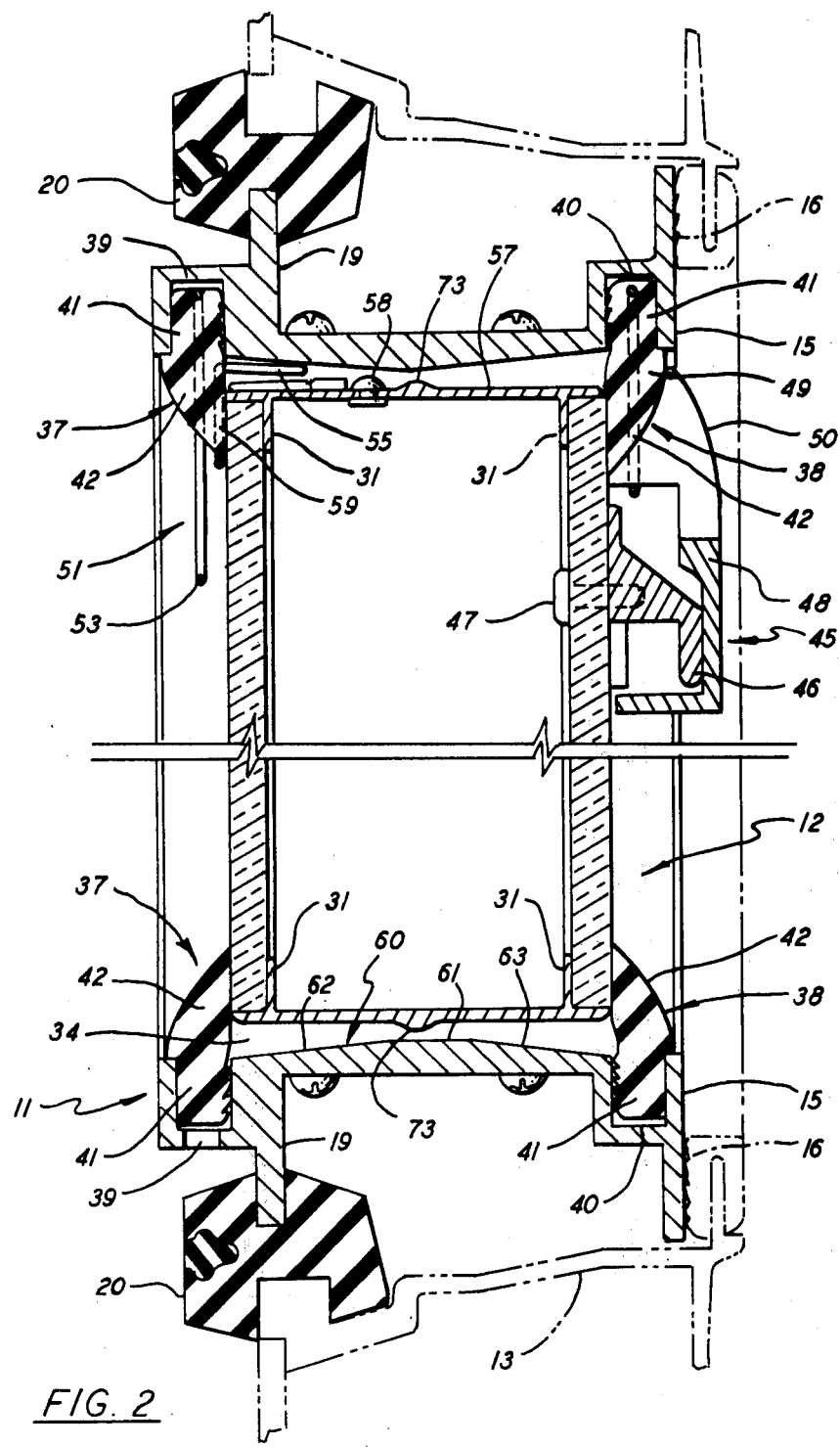
FIG. 2 is a section taken along lines 2—2 in FIG. 1 further illustrating the construction of the sash.

As best seen in FIG. 2, each sash unit is supported within a complimentary opening by means of strippable deformable seals that include an inside margin seal 38 and an outside margin seal 37. The margin seals are carried within perimeter grooves 39 and 40 formed about the outer periphery of each frame opening adjacent to the sash units. Each seal includes a base section 41 that is press-fitted into the receiving groove and an enlarged body section 42 that extends inwardly beyond the limits of the frame opening. In assembly, the body of the seal is biased into holding contact against the interior or exterior facial margins of the lights to enhance the closure's resistance to weather and to further secure the lights in assembly. In assembly, the sashes are suspended by the seals within the frame openings with a slight clearance being maintained between the end walls of the sash and the inside surface of the opening.

The inside face of each sash contains an emergency release mechanism 45 that includes a handle 46 secured to the interior light by means of screws 47 or the like and a pull bar 48 that overlies the handle when both are in a stored position as shown in the drawings. The pull bar is secured to a wire cable 49 that passes upwardly from the contoured arms 50—50 of the bar into the strippable seal. The cable, after entering the seal, turns laterally and is arranged to run some distance along the length of the seal to the right and left of the bar. The cable runs are of sufficient length so that when the lift bar is pulled away from the face of the light, the seal will also be pulled from between the sash and the frame. By use of the bar and wire mechanism the seal can be removed entirely from the assembly. Once this is accomplished the handle is exposed, enabling it to be grasped by hand and pulled outwardly to remove the sash from the opening and thus provide an emergency exit.

A similar emergency release mechanism 51 is also located at the outside face of each sash. The outside release mechanism is purposely made less visible than the inside one in order to minimize tampering therewith. The outside mechanism includes a tear wire 53 embedded within the outside seal and which is brought out of the seal to form a pull grip 53. The pull grip is operable to enable a person situated outside the vehicle to strip the outside seal and thus free the sash from the frame.

A second release cable 55 is packed in a coil configuration between the sash and the frame as shown in FIG. 2. Both ends of the release cable are secured to the upper end wall 57 of the sash as, for example, by rivets 58. A small hand engagable pull ring 59, which is part of the release cable, is passed outwardly beyond the upper edge of the sash and turned downwardly so that it can be stored beneath the seal against the face of the light. Once the outside seal is stripped away, the pull ring is exposed thereby allowing it to be pulled and the sash removed as described above.

As previously noted, many safety release closures that are designed to be pulled free of a surrounding frame tend to turn obliquely in the frame opening during removal and thus become jammed within the frame. Continued forcing of the turned sash magnifies the jamming effect and causes the sash to be locked tighter to the frame. Under emergency conditions, where time is important, jamming of an emergency exit can prove to be disasterous.

The interior surface 60 of the frame opening embodied in the present invention is specially contoured to eliminate the tendency of the sash to jam in the opening during removal thereof. Referring again to FIG. 2, the interior surface of the opening contains a raised section 61 that is situated at about the middepth region of the opening. Preferably the raised section extends continuously about the entire periphery of the opening. Two bevelled walls 62,63 extend laterally to either side of the raised middepth region and slope downwardly toward the inner and outer edges of the opening so that the face width across the extreme edges of the opening is always greater than the width across its middepth region. In practice, the bevelled walls can be either flat or slightly convex in form.

The endwalls 57—57 of each sash are generally flat planar members that are mounted in perpendicular alignment with the outer and inner faces of the light sets. Accordingly the face width over each sash remains constant across the depth of the unit. As should be now evident, any tendency for the sash to turn or cock in the opening during removal is compensated for by the progressively expanded opening. As a result of the opening geometry, the sash will not bind as it is pulled either toward the inside or the outside of the vehicle in which it is installed. The raised center section of the opening further provides a one point bearing surface upon which the sash can easily slide as it moves through the opening.

A raised embossment 73 is also provided about the endwall surfaces of the sash which in assembly, is positioned adjacent to the raised section 61 provided in the opening wall. Here again, the embossment provides a bearing surface that is capable of acting against the walls of the opening to further facilitate quick and safe removal of the sash. As should be evident from the present disclosure, this feature, coupled with those described above, furnish an emergency escape system that is ideally well suited for use in high speed mass transit vehicle that can be relied upon to provide an escape route for the passengers of the vehicle in the event normal exits are blocked.

While this invention has been described with reference to the structure disclosed herein, it is not confined to the details set forth and this application is intended to cover any modifications or changes as may come within the scope of the following claims.

We claim:

1. A safety release closure that is capable of opening toward either the interior or the exterior of a vehicle to provide an emergency exit from the vehicle, the closure including a mounting frame having at least one opening for receiving a window sash therein, the inside surface of said opening having a raised center section extending about the middepth of the opening and bevelled walls sloping downwardly and outwardly from the raised section towards the interior and exterior edges of said opening whereby the opening is wider across it two edges than across its middepth region, a sash generally complimenting the opening in the frame which is centered within said opening, a first deformable margin seal positioned about the interior edge perimeter of the sash and a second deformable margin seal positioned about the exterior edge perimeter of the sash with the seals being disposed in biasing contact between the sash and the frame to support said sash within said frame, first pull means attached to said first deformable margin seal and a second pull means secured to said second deformable margin seal that are independently engagable to enable the seal associated to be pulled from between the frame and the sash thereby allowing the sash to be removed from the frame.

2. The safety closure of claim 1 wherein said frame contains an interior groove for receiving a portion of said first deformable seal therein and an exterior groove for receiving a portion of said second deformable seal therein, the grooves being arranged to maintain the seal against the inner and the outer facial side walls of the sash.

3. The safety closure of claim 1 wherein each pull means includes a wire embedded beneath the surface of said associated seal that extends at least partially along the length of the seal.

4. The safety closure of claim 3 wherein a first handle means is secured to the interior of said sash and a second handle means is secured to the exterior of said sash for facilitating removal thereof of front of said frame.

5. The safety closure of claim 1 wherein the peripheral endwalls of the sash that face said inside surface of the frame opening are flat planar walls which are perpendicular with the two end faces of said sash.

6. The safety closure of claim 5 wherein the peripheral endwalls of the sash further includes a raised bearing surface arranged to ride in sliding contact against the inside surface of the frame opening as the sash is removed from the frame.

7. A safety release closure suitable for use in a mass transit vehicle including
    a mounting frame having an opening formed therein of predetermined depth, the inner surface of said opening being contoured so that it slopes downwardly and outwardly from the middepth region toward the inside and the outside edges of the opening,
    a sash mounted within the opening with the peripheral endwalls of the sash being adjacent to said inner surface of the opening,
    strippable seals mounted about the interior and the exterior facial sidewall margins of the sash, said seals being disposed between the sash and the frame to support the sash within the frame.

8. The safety release closure of claim 7 wherein the inner surface of the opening is arcuate in form.

9. The safety release closure of claim 7 wherein the inner surface of the opening is formed by two bevelled planar walls that are cojoined in the middepth region of the opening.

10. The safety release closure of claim 7 wherein the peripheral endwalls of the sash further includes a raised bearing surface at least partially extended about the periphery thereof that is arranged to ride in sliding contact against the contoured surface of the frame opening.

11. The safety release closure of claim 7 that further includes a pull means operatively connected to each of the strippable seals that is actionable to permit the seal to be pulled from between the sash and the frame.

12. The safety release closure of claim 11 that further includes handle means attached to both the interior and to the exterior of the sash that is engagable to permit the sash to be removed from the frame in either an inwardly or an outwardly direction.

* * * * *